(12) United States Patent
Petrosyan (10) Patent No.: US 11,615,515 B2
(45) Date of Patent: Mar. 28, 2023

(54) SUPERPIXEL MERGING (71) Applicant: SUPERANNOTATE AI, INC., Sunnyvale, CA (US)

(72) Inventor: Vahan Petrosyan, Yerevan (AM)

(73) Assignee: SUPERANNOTATE AI, INC., Sunnyvale, CA (US)

( * ) Notice: Subject to any disclaimer, the term of this patent is extended or adjusted under 35 U.S.C. 154(b) by 186 days.

(21) Appl. No.: 17/049,374

(22) PCT Filed: Apr. 22, 2019

(86) PCT No.: PCT/US2019/028583
§ 371 (c)(1),
(2) Date: Oct. 21, 2020

(87) PCT Pub. No.: WO2019/209751
PCT Pub. Date: Oct. 31, 2019

(65) Prior Publication Data
US 2021/0248729 A1 Aug. 12, 2021

(30) Foreign Application Priority Data
Apr. 24, 2018 (SE) .................... 1850481-1

(51) Int. Cl.
G06K 9/62 (2022.01)
G06T 5/50 (2006.01)
(Continued)

(52) U.S. Cl.
CPC .............. G06T 5/50 (2013.01); G06K 9/6215 (2013.01); G06T 7/13 (2017.01); G06T 7/90 (2017.01);
(Continued)

(58) Field of Classification Search
CPC .......... G06K 9/6215; G06T 5/50; G06T 7/13; G06T 7/90; G06T 2207/10024; G06T 2207/20221; G06V 10/758
See application file for complete search history.

(56) References Cited

U.S. PATENT DOCUMENTS

| 8,619,082 B1 | 12/2013 | Ciurea et al. |
| 2015/0234863 A1 | 8/2015 | Lilje et al. |
| 2017/0274285 A1* | 9/2017 | Aguilar .................. G06T 7/155 |

FOREIGN PATENT DOCUMENTS

| CN | 105118049 A | 2/2015 |
| EP | 2733666 B1 | 3/2017 |

OTHER PUBLICATIONS

Han et al. ("A novel segmentation approach for color images with progressive superpixel merging," Proceedings of 2012 2nd International Conference on Computer Science and Network Technology; Date of Conference: Dec. 29-31, 2012) (Year: 2012).*

(Continued)

Primary Examiner — Yubin Hung
(74) Attorney, Agent, or Firm — Arluys IP, P.C.

(57) ABSTRACT

Techniques are described for merging super pixels of an image. The image may include two superpixel, for which a similarity value is calculated. The similarity value is determined based on the link and cut values of the superpixels, the similarity value representing pixel-based similarity of the superpixels. The link value is determined based on the similarity between color values of the pixels in the superpixels, while the cut value is determined based on the edge pixels of the superpixels. Based on the calculated similarity value, the system determines whether to merge the superpixels and if so, merges the superpixels thereby generating another superpixel.

19 Claims, 3 Drawing Sheets (51) Int. Cl.
  *G06T 7/13* (2017.01)
  *G06T 7/90* (2017.01)
  *G06V 10/75* (2022.01)

(52) U.S. Cl.
  CPC .. *G06V 10/758* (2022.01); *G06T 2207/10024* (2013.01); *G06T 2207/20221* (2013.01)

(56) References Cited

OTHER PUBLICATIONS

Achanta et al. ("SLIC Superpixels Compared to State-of-the-Art Superpixel Methods," IEEE Transactions on Pattern Analysis and Machine Intelligence, vol. 34, No. 11, Nov. 2012) (Year: 2012).*
Wu et al. ("Cartoon image segmentation based on improved SLIC superpixels and adaptive region propagation merging," IEEE International Conference on Signal and Image Processing; Date of Conference: Aug. 13-15, 2016) (Year: 2016).*
Hsu et al. ("Efficient image segmentation algorithm using SLIC superpixels and boundary-focused region merging," 9th International Conference on Information, Communications & Signal Processing; Date of Conference: Dec. 10-13, 2013) (Year: 2013).*
Chaibu et al. ("Adaptive strategy for superpixel-based region-growing image segmentation," arXiv: 1803.06541v1; Mar. 17, 2018) (Year: 2018).*
Li et al. ("Edge-based split-and-merge superpixel segmentation," IEEE International Conference on Information and Automation; Date of Conference: Aug. 8-10, 2015) (Year: 2015).*
PCT/US 2019/028583, PCT Written Opinion of the International Searching Authority, dated Sep. 5, 2019.

* cited by examiner

SUPERPIXEL MERGING

BENEFIT CLAIM

This application is a U.S. National Stage Patent Application filed under 35 U.S.C. § 371 of International Patent Application PCT/US 2019/028583 filed Apr. 22, 2019, which claims the benefit of Sweden Patent Application No. 1850481-1 filed on Apr. 24, 2018, the entire contents of all of which are hereby incorporated by reference as if fully set forth herein for all purposes.

FIELD OF THE TECHNOLOGY

The present invention generally relates to a method for processing superpixels, and more particularly to a method for merging superpixels into a smaller set of superpixels.

BACKGROUND

The processing and/or editing of images has grown rapidly with the growth of social media, both when it comes to professional use and home use. There are many image editing applications that are developed for running on user devices, such as computers, smartphones, tablets or the like. These devices are usually provided with a touch screen. When editing an image, it is important to have a good partial selection tool for the image. However, many of today's selection tools are to coarse and the selection of a desired part or object of the image will become crucial when designing such an application especially when one uses fingers to select a desired object on the touch screen.

The drawbacks with using the fingers when selecting and cutting a part of an image is that it often is very time consuming. This will negatively affect the efficiency when editing an image. Furthermore, the fingers of a user are often relatively large compared to the region that is to be selected and it will therefore not be possible to select exactly all the intended pixels which will lower the quality and accuracy of the selection.

Another approach during editing is to use "smart" selection methods. In such methods, a user selects a region in a desired part of the image and smart algorithms extend that region hoping that the extended region is the desired region. This will increase the efficiency of the editing process, but still has some drawbacks. Many of the smart algorithms do not work with high enough quality when selecting regions, i.e. the do not preserve the boundaries in the image very well. Furthermore, the user may lose control over the selection as these smart algorithms either over selects or under selects the desired region.

Another way to facilitate the selection of objects is to use an algorithm that creates superpixels. Superpixel algorithms have become increasingly popular over the last decade and are currently used as an important part in many computer vision applications. These superpixel algorithms are often used as a first preprocessing step before other algorithms take over. It is much more efficient to process maybe hundreds or thousands of superpixels than millions of single pixels. Thus, one very important aspect of creating superpixels is the speed these algorithms work with, i.e. how fast the superpixels are created. Another important aspect is the quality of the created superpixels, i.e. how well the superpixels captures the true boundaries of the image. These two aspects are negatively correlated, i.e. the generation of high quality superpixels tends to be slow.

Among other things the superpixel quality depends on the number of superpixels that are created. With an increasing number of superpixels the quality will be enhanced. One of the fastest superpixel algorithms is called watershed segmentation. The quality of the superpixels created with watershed segmentation is very low when the number of superpixels is very small, such as 2 to k superpixels, where k can be in the range from 3 to 10000 (assuming that the number of pixels is less than 10000). However, the quality of the superpixels created with watershed segmentation will increase when the number of superpixels is increased, i.e. to between k to K, where K may be in the range between k+1 and N, wherein N is the total number of pixels in the image. There are a number of superpixel algorithms that generate high quality superpixels, such as SEEDS (Superpixel Extracted via Energy-Driven Sampling), linear spectral clustering and entropy rate superpixel algorithms. However, they all are much slower than watershed segmentation, usually in the order of magnitude of one to three times slower.

Approaches may include how an image is segmented into superpixels by constructing a graph with vertices connected by edges. Each vertex corresponds to a pixel in the image and each edge is associated with a weight indicating a similarity of the corresponding pixels. A subset of the edges in the graph are selected to segment the graph into subgraphs. The selection is based on maximizing an objective function, which is based on an entropy rate and balancing term. The edges having the maximum gains are added to the graph until a number of subgraphs is equal to some threshold. In practice, the entropy rate algorithm is capable of producing high quality superpixels, but is relatively slow.

Thus, there is a need for a method for processing superpixels which enables generation of superpixels for a certain quality at a speed that is greater than today. There is also a need for taking superpixels which already have a good quality and improve the superpixels to great superpixels without using much extra time.

BRIEF SUMMARY OF THE INVENTION

The object of the present invention is to overcome at least some of the above described disadvantages and provide an improved method for processing superpixels by merging a given set of superpixels into a smaller set of larger superpixels. The described techniques may be applicable to other technical problems, non-limiting example of which is image annotation, a process by which metadata describing the content of an image (e.g. keywords describing depicted objects in the image) is assigned to the image. Merged superpixels may more accurately depict objects in the image and thus, provide for more accurate and descriptive keywords for the image or the portions thereof.

According to an aspect of the present invention there is provided a method of merging superpixels in an image from an initial number of superpixels into a final number of superpixels. The method is performed by a user device and comprises receiving the image, comprising information about the initial number of superpixels, about the contours of the image, and the value of the final number of superpixels into which the image is to be segmented. The method further comprises calculating a similarity value for the similarity between each superpixel and its neighboring superpixels. The similarity value is based on Penalized Average Linkage Cuts (PALC), where PALC $(S_i, S_j)$=Cut $(S_i, S_j)$*Link $(S_i, S_j)$ and the Cut and Link functions are chosen depending on the properties of the superpixels $(S_i,$ $S_j$). The pair of superpixels that has the highest similarity value is the selected. Thereafter it is determined that the selected pair of superpixels that has the highest similarity value, when merged, is more than h times larger than the smallest superpixel in the image. In response thereto the smallest superpixel in the image is selected and a similarity value for the similarity between pairs of the selected smallest superpixel and superpixels neighboring the smallest superpixel is calculated, and further in response to the determining step merge the pair of superpixels that has the highest similarity value. Thereafter, it is determined that the current number of superpixels in the image is greater than the received value of final number of superpixels, and in response thereto the steps of calculating, selecting, determining and merging are repeated until the final number of superpixels into which the image is to be segmented is reached.

In an exemplary embodiment, the method further comprises receiving a constant, h, wherein h is within a range of 1 to N, where N is the total number of pixels in the image.

In yet another exemplary embodiment the Penalized Average Linkage Cuts (PALC) similarity value of a superpixel pair of superpixel i, $S_i$, and superpixel j, $S_j$, is determined by the following expression:

$$PALC(S_i, S_j) = Cut(S_i, S_j) \cdot Link(S_i, S_j)$$

According to another aspect of the present invention a user device for merging superpixels in an image from an initial number of superpixels into a final number of superpixels is provided. The user device comprises a controller comprising a processor and a memory, the memory comprising instructions which when executed by the processor causes the user device to receive the image comprising the initial number of superpixels and the value of the final number of superpixels into which the image is to be segmented. The user device is further caused to calculate a similarity value for the similarity between each superpixel and its neighboring superpixels, wherein the similarity value is based on PALC, where PALC $(S_i, S_j)$=Cut $(S_i, S_j)$*Link $(S_i, S_j)$ and the Cut and Link functions are chosen depending on the properties of the superpixels $(S_i, S_j)$. The user device is caused to select the pair of superpixels that has the highest similarity value and determine that the selected pair of superpixels that has the highest similarity value, when merged, is more than a constant, h, times larger than the smallest superpixel in the image. In response thereto, the user device is caused to select the smallest superpixel in the image and calculate a similarity value for the similarity between pairs of the selected smallest superpixel and superpixels neighboring the smallest superpixel, and further in response to the determining step the user device is caused to merge the pair of superpixels that has the highest similarity value. The user device is then caused to determine that the current number of superpixels in the image is greater than the received value of final number of superpixels, and in response thereto, repeat the steps of calculate, select, determine and merge until the current number of superpixels in the image is equal to the final number of superpixels.

In an exemplary embodiment, the user device is further caused to receive a constant, h, wherein h is within a range of 1 to N, where N is the total number of pixels in the image.

In yet another exemplary embodiment the user device is caused to determine the Penalized Average Linkage Cuts (PALC) similarity value of a superpixel pair of superpixel i, $S_i$, and superpixel j, $S_j$, by the following expression:

$$PALC(S_i, S_j) = Cut(S_i, S_j) \cdot Link(S_i, S_j)$$

According to another aspect, a computer program and a computer program product comprising computer readable code is provided, which when executed in the user device preforms the method steps described above.

With the above described method, it is possible to get superpixels with the same or better quality as when using for example an entropy rate algorithm but that will be more than ten times faster. The method may be used on the output from any superpixel and edge detection algorithms to further improve the quality by applying the described superpixel merge on the output.

BRIEF DESCRIPTION OF THE DRAWINGS

The solution will now be described in more detail by means of exemplary embodiments and with reference to the accompanying drawings, in which.

DETAILED DESCRIPTION

Figure 1:
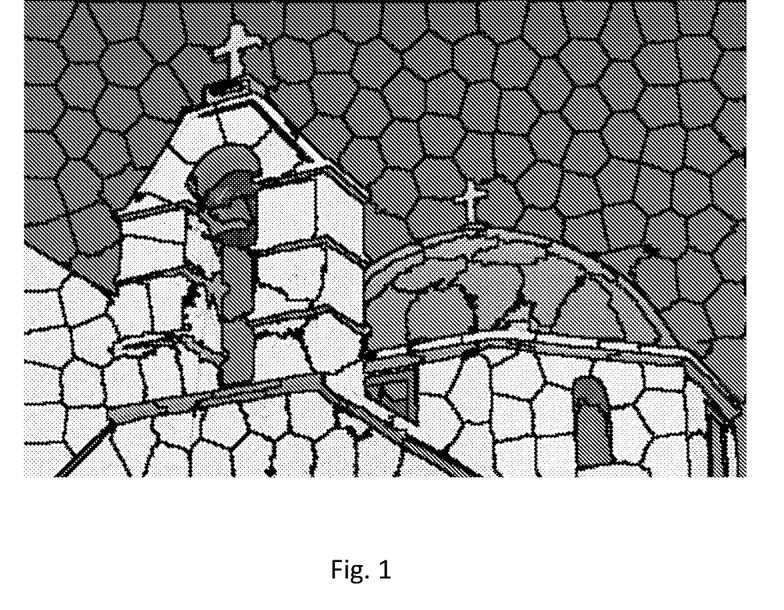
FIG. 1 is an example of segmentation into superpixels of an image after processing using a prior art superpixel algorithm, such as linear spectral clustering.

FIG. 1 shows an example of segmentation into superpixels of an image. This segmentation may be done with any prior art superpixel algorithm for generating superpixels. Such algorithm may be any of the algorithms mentioned in the background section, such as linear spectral clustering.

Figure 2:
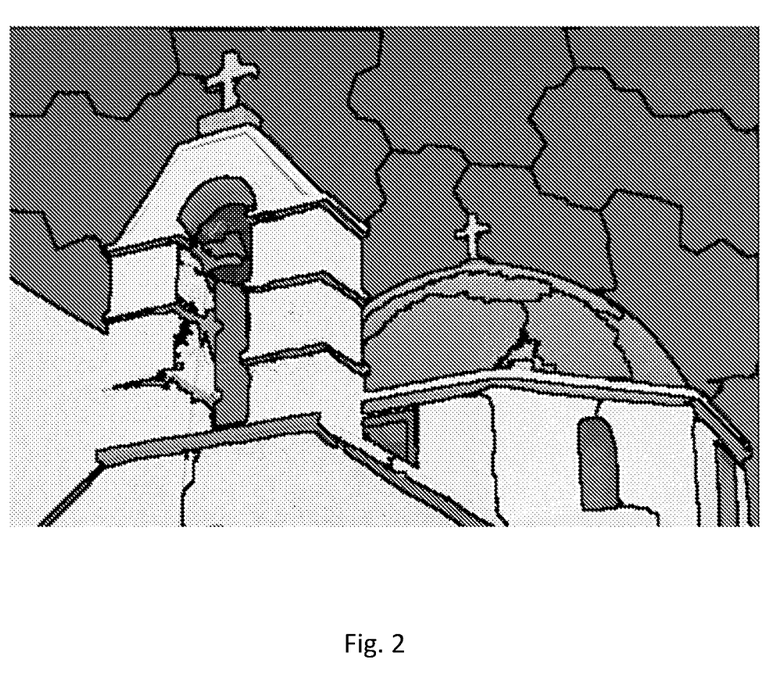
FIG. 2 is an example of segmentation into superpixels of an image already segmented into superpixels in a first stage and further processed with embodiments of the method of the present invention.

FIG. 2 is an example of how an image may look like after it has been segmented into fewer superpixels than in FIG. 1. The image shown in FIG. 1 may be used as an input when performing the method and FIG. 2 may be the output as will be explained in greater detail below in conjunction with FIG. 6.

In image processing and image recognition, pixel connectivity is the way in which pixels in 2-dimensional images relate to their neighbors. There are different types of connectivity, some of which will briefly be described here.

Figure 3:
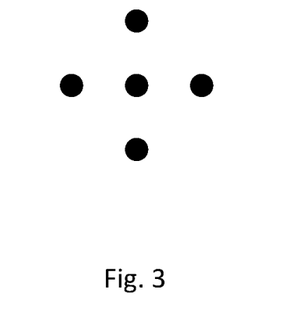
FIG. 3 illustrates the principle of a four-connected neighborhood.

FIG. 3 illustrates the principle of a four-connected neighborhood. Four connected pixels are neighbors to every pixel that touches one of their edges. These pixels are connected horizontally and vertically. In terms of pixel coordinates, every pixel that has the following coordinates (x±1, y) or (x, y±1) is connected to a pixel at (x, y).

Figure 4:
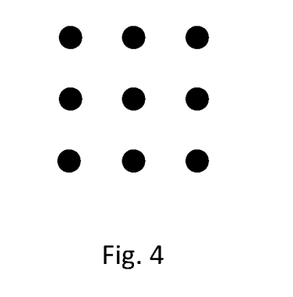
FIG. 4 illustrates the principle of an eight-connected neighborhood.

FIG. 4 illustrates the principle of an eight-connected neighborhood. In this case eight connected pixels are neighbors to every pixel that touches one of their edges or corners. These pixels are connected horizontally, vertically, and diagonally. In addition to four-connected pixels, each pixel with coordinates (x±1, y±1) is connected to a pixel at (x, y).

When talking about neighboring superpixels in context of this application, these neighboring superpixels may be chosen using any type of connectivity, for example in addition to above also six-connected pixels may be used as neighbors.

Figure 5:
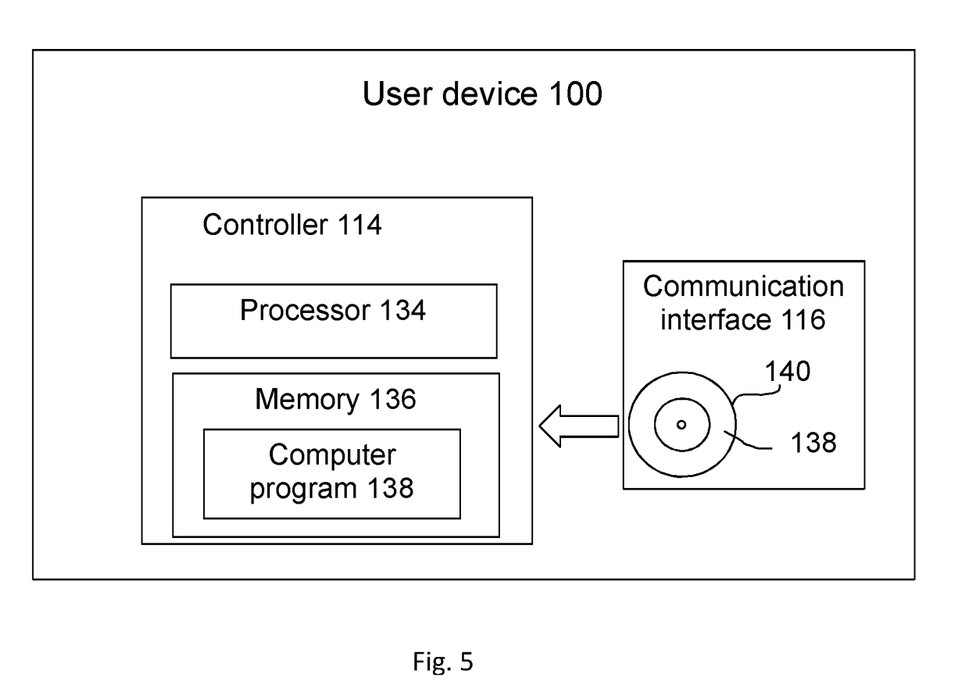
FIG. 5 is a block diagram illustrating a user device, according to possible embodiments.
Figure 6:
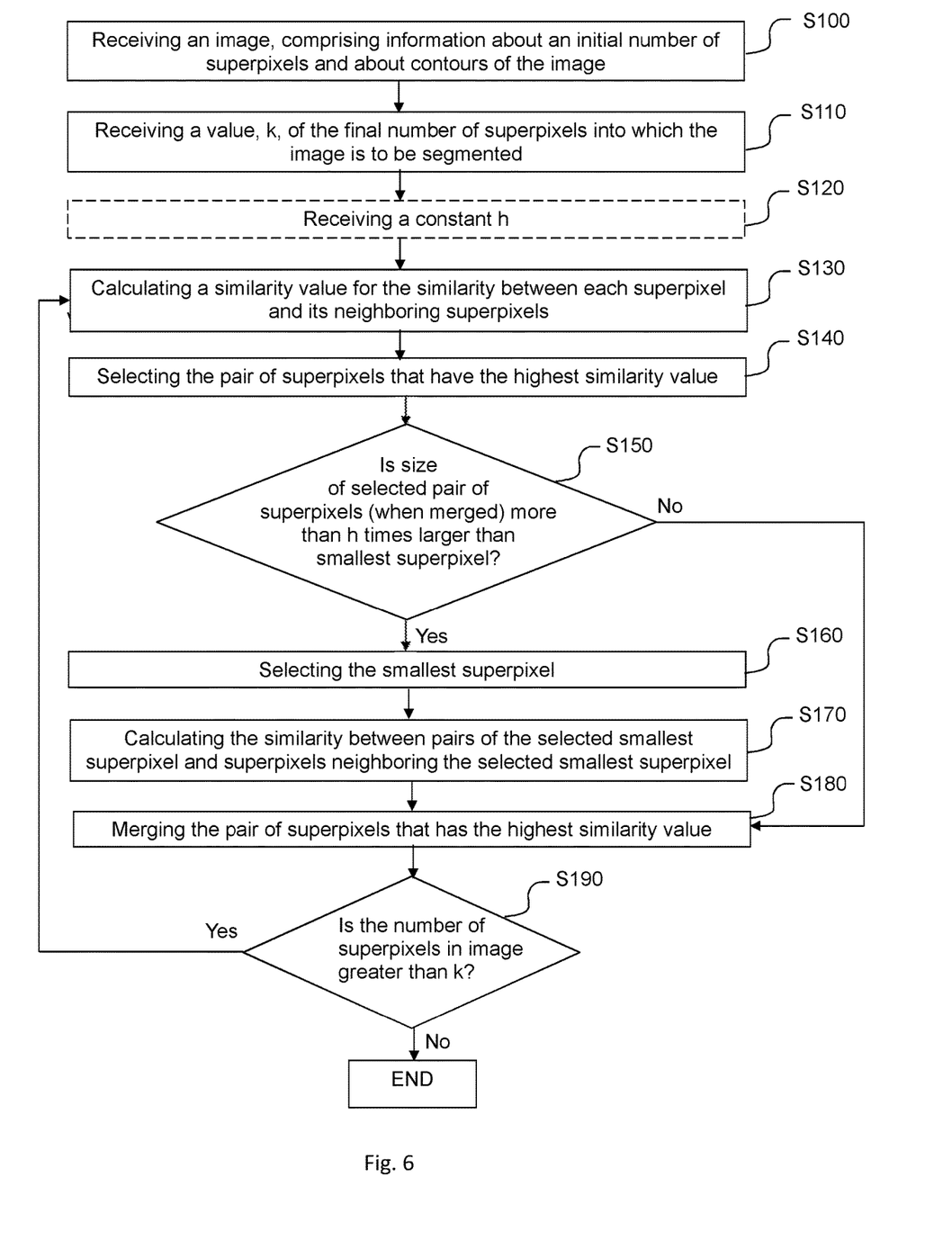
FIG. 6 is a flowchart of an embodiment of the method for merging superpixels.

Turning now to FIG. 5 and FIG. 6 the method for merging superpixels will be closer described. FIG. 5 is a block diagram illustrating a user device 100, according to an exemplary embodiment, and is an example of a user device 100 on which the method may be performed and which user device 100 is caused to perform the method. The user device 100 may be a mobile telephone, a smart phone, a tablet computer, a laptop, a personal computer or the like. The user device 100 comprises a controller 114, which in turn may comprise a processor 134 and a memory 136. The user device 100 also comprises a communication interface 116 for communication with other devices. The interface 116 may be configured for both wireless communication and communication by wire. The controller 114 may be tailor made for this application or be an off-the-shelf processor and memory configured for this application. For example, the described processor may comprise a single Central Processing Unit, CPU, or could comprise two or more processing units. The processor may include general purpose microprocessors, instruction set processors and/or related chips sets and/or special purpose microprocessors such as Application Specific Integrated Circuits, ASICs, Field Programmable Gate Arrays, FPGAs or Complex Programmable Logic Devices, CPLDs. Even if the ASICs, FPGAs and CPLDs as such do not include a processor and memory, they may perform the same function as the controller 114 depicted with processor and memory in FIG. 5. Thus, FIG. 5 is only used to describe the function performed by the user device 100 and should not be interpreted as the actual physical layout of the user device 100, which for that matter also could be a device. Thus, the user device 100 function may be realized by a controller 114 in form of processor and memory, ASICs, FPGAs and/or CPLDs, i.e. in hardware only, in software or in any combination thereof.

If carried out in software, the software may be stored in the memory 136 in form of a computer program 138. However, the software in form of the computer program 138 may also be carried by a computer program product 140 which is loaded into the user device 100 for execution. The computer program products may be any medium capable to carry the computer program 138, such as CD, DVD, flash memory, USB-stich or downloadable objects. Each computer program product 140 or memory 136 thus comprises a computer readable medium on which the computer program 138 is stored e.g. in the form of computer program units. For example, the memories may be a flash memory, a Random-Access Memory, RAM, a Read-Only Memory, ROM or an Electrically Erasable Programmable ROM, EEPROM, and the program units could in alternative embodiments also be distributed on different computer program products.

The controller 114 in the user device 100 is configured to execute the method described below for example by letting the processor 134 execute instructions stored in the memory 136.

Turning now to FIG. 6 the method performed by the user device for merging superpixels will be described closer. As mentioned above the method merges superpixels in an image having an initial number of superpixels into a final number of superpixels. Each superpixel has an average color intensity value, as defined by any suitable color space. A color space is a specific organization of colors. A color space identifies a particular combination of color model and mapping function. A color model is an abstract mathematical model describing the way colors can be represented as tuples of numbers (e.g. triples in RGB or quadruples in CMYK. Adding a specific mapping function between a color model and a reference color space establishes within the reference color space a definite "footprint", known as a gamut, and for a given color model this defines a color space. For example, Adobe RGB and sRGB are two different absolute color spaces, both based on the RGB color model. When defining a color space, the usual reference standard is the CIELAB or CIEXYZ color spaces, which were specifically designed to encompass all colors the average human can see. As for the present invention, any color space may be used which is capable of outputting the average color intensity value for a superpixel, such as the CIELAB color space.

The method starts with step S100, in which the user device 100 receives an image $\mathcal{X} = \{x_l\}_{l=1}^{N}$ consisting of N pixels. The intensity value of each pixel is defined in some $\mathcal{X}$ arbitrary color space, such as RGB, CIELAB or gray scale. The received image comprises information about the initial number, K, of superpixels that the image consists of. The initial number of superpixels, K, is preferably above 1000. Furthermore, the received image also comprises information about the contours of the image. The initial number of superpixels may have been obtained by using any prior art superpixel algorithm and the contour information may be obtained by using any known contour detection algorithm.

Let $\mathcal{C} = \{c_l\}_{l=1}^{N} \in [0,1]^N$ represent the contour information of the image $\mathcal{X}$, given by any arbitrary contour detection algorithm. Let $\mathcal{S} = \{S_l\}_{l=1}^{N}$ represent the initial decomposition of $\mathcal{X}$ into K superpixels ($S_i \subset \{1, 2, \ldots, N\}$). Here, K=N represents each pixel as a superpixel. From the received image $\mathcal{X}$, pixel connectivity is determined by constructing a fourth-degree weighted graph or by using any other suitable pixel connectivity, G, method, where G=($\mathcal{V}$, $\varepsilon$, $\mathcal{W}$), whose vertices $\mathcal{V}$ are the pixels of the image, and whose edges $\varepsilon$ form a grid of connecting neighboring pixels. The weight of an edge or contour represents the similarity of two corresponding pixels. For two pixels l and l' $w_{l,l'} = \mathcal{K}_1(l, l')$, where $\mathcal{K}_1(l, l')$ is an arbitrary function depending on pixels l and l'. For example, this function can be defined as a Kernel as follows:

$$\mathcal{K}_1(l, l') = e^{-\frac{c_l + c_{l'}}{\sigma_1}}$$

In this case, when the pixels l, l' actually belong to a boundary of an object, the contour values $c_l$, $c_{l'}$, tend to be high (close to 1) and hence the weight $w_{l,l'}$ tends to be very small. $\sigma_1$ is a constant between 0 to 1. The cut value of two superpixels $S_i$ and $S_j$ is then defined by Cut($S_i,S_j$)=$\mathcal{K}_3(S_i,S_j)$ Where $\mathcal{K}_3(S_i, S_j)$ is an arbitrary function depending on the size, the perimeter and/or the color intensity values of superpixels $S_i$ and $S_j$. For example, this function can be defined as:

$\mathcal{K}_3(S_i,S_j)=\Sigma_{l \in S_i}\Sigma_{l' \in S_j} w_{l,l'}$

The linkage distance of two superpixels is defined as

Link($S_i,S_j$)=$\mathcal{K}_2(S_i,S_j)$, where the $\mathcal{K}_2(S_i, S_j)$ is another arbitrary function depending on superpixels $S_i$ and $S_j$. For example, this function can be defined by a Kernel as follows:

$$\mathcal{K}_2(S_i, S_j) = \frac{e^{-\frac{\|\mu_i - \mu_j\|}{\sigma_1}}}{|S_i||S_j|},$$

where $\mu_i$ represents the average color intensity of superpixel $S_i$ and $|S_i|$ represents the number of pixels in $S_i$. Given the Cut and Link functions a Penalized Average Linkage Cuts, PALC, similarity is defined as follows:

$$PALC(S_i, S_j) = Cut(S_i, S_j) \cdot Link(S_i, S_j)$$

As mentioned above the arbitrary Cut and Link functions are depending on the superpixels $S_i$ and $S_j$, i.e. the properties of the superpixels such as size, perimeter and/or color intensity values.

In step S110, the user device 100 also receives the value of the final number, k, of superpixels into which the image is to be segmented. The number of final superpixels may be in the range of 2 to K−1 superpixels. After receiving the image and the final number of superpixels a similarity value is calculated in step S130, according to the PALC similarity function defined above using the Cut and Link functions. The similarity value is used for determining the similarity between each superpixel and its neighboring superpixels, wherein the similarity value is based on the PALC value between each pair of neighboring superpixels.

In step S140 the pair of superpixels that has the highest similarity value is selected. After this selection it may be checked, in step S150, if the size of the selected pair of superpixels, when this selected pair is merged, is more than a constant, h, times larger than smallest superpixel. h is a constant that preferably is between 10 and 100. In one embodiment the constant h is preprogrammed into the user device 100, in another embodiment a user may enter it into the user device 100. Thus, the constant h may be received by the user device 100, in an optional step 120 (shown with dashed lines in FIG. 6). If it is determined that the size of the selected pair of superpixels, when this selected pair is merged, is more than h times larger than smallest superpixel, the smallest superpixel is selected in step S160 and the similarity value between pairs of the selected smallest superpixel and superpixels neighboring the selected smallest superpixel is calculated in step S170. Thereafter the in step S180 the selected pair of superpixels is merged into a larger superpixel.

If it in step S150 is determined that the size of the selected pair of superpixels, when this selected pair is merged, is not more than h times larger than the smallest superpixel, steps S160 and S170 are omitted and the pair of selected superpixels that has the highest similarity value is are merged in step S180. Thus, when the difference in size between two superpixels that are to merged is smaller than h, the method proceeds directly from step S150 to step S180. This check regarding the size is done in order to somewhat balance the sizes of the superpixels.

Thereafter, in step S190 it is determined if the current number of superpixels in the image is greater than the received value of final number of superpixels. If the number of superpixels is greater than the target value the method continues with reducing the number of superpixels by repeating the steps of calculating, S130, selecting, S140, determining S150 and merging S180 until the current number of superpixels in the image is equal to the received value of final number of superpixels. If the current number of superpixels instead is the same as the received value of the final number of superpixels, the target number of superpixels has been achieved and the method ends.

In a first embodiment for merging superpixels in an image from an initial number of superpixels into a final number of superpixels, the embodiment being performed by a user device (100) and includes: receiving (S100) the image comprising information about the initial number of superpixels and about the contours of the image, receiving (S110) a value of the final number of superpixels into which the image is to be segmented, calculating (S130) a similarity value for the similarity between each superpixel ($S_i$) and its neighboring superpixels ($S_j$), wherein the similarity value is based on Penalized Average Linkage Cuts, PALC, where PALC ($S_i$, $S_j$)=Cut ($S_i$, $S_j$)*Link ($S_i$, $S_j$) and the Cut and Link functions are chosen depending on the properties of the superpixels ($S_i$, $S_j$), selecting (S140) the pair of superpixels that has the highest similarity value, determining (S150) that the selected pair of superpixels that has the highest similarity value, when merged, is more than a constant, h, times larger than the smallest superpixel in the image, and in response thereto: a) selecting (S160) the smallest superpixel in the image, i.e. the superpixel that consists of the fewest number of pixels, and b) calculating (S170) the similarity value for the similarity between pairs of the selected smallest superpixel and superpixels neighboring the selected smallest superpixel, and further in response to the determining step: a) merging (S180) the pair of superpixels that has the highest similarity value, b) determining (S190) that the current number of superpixels in the image is greater than the received value of the final number of superpixels, and in response thereto, repeating the calculating, selecting, determining and merging steps (S130, S140, S150, S180) until it is determined (S190) that the current number of superpixels in the image is equal to the received value of the final number of superpixels.

In a related second embodiment, the first embodiment further includes receiving (S120) the constant, h, wherein h is within a range of 1 to N and N is an original number of pixels in the received image.

In a related third embodiment, the first or second embodiments include Cut $(S_i, S_j) = \Sigma_{l \in S_i} \Sigma_{l' \in S_j} \mathcal{K}_1(l, l')$, $$Link(S_i, S_j) = \frac{e^{-\frac{\|\mu_i - \mu_j\|}{\sigma_1}}}{|s_i||s_j|}, \text{ and } \mathcal{K}_1(l, l') = e^{-\frac{c_l + c_{l'}}{\sigma_1}},$$

where $\mu_i$ represents the average color intensity of $S_i$, $c_l$ represents the contour value of the pixel corresponding to $x_l$, and wherein $\sigma_1$ and $\sigma_2$ are constants.

In a related fourth embodiment, any of the first through third embodiments include the average color intensity values that are defined by a CIELAB color space.

In a related fifth embodiment, any of the first through four embodiments include neighboring superpixels that are selected using a 4-connected neighborhood.

In a sixth embodiment, a user device (100) for merging superpixels in an image from an initial number of superpixels into a final number of superpixels, wherein the user device (100) comprises a controller (114) comprising a processor (134) and a memory (136), the memory (136) comprising instructions which when executed by the processor (134) causes the user device (100) to perform any of the first through fifth embodiments.

In a seventh embodiment for merging superpixels in an image from an initial number of superpixels into a final number of superpixels, the embodiment being performed by a user device (100) and includes: receiving the image comprising information about the initial number of superpixels and about the contours of the image, receiving a value of the final number of superpixels into which the image is to be segmented, calculating a similarity value for the similarity between each superpixel ($S_i$) and its neighbouring superpixels ($S_j$), wherein the similarity value is based on Penalized Average Linkage Cuts, PALC, where PALC ($S_i$, $S_j$)=Cut ($S_i$, $S_j$)*Link ($S_i$, $S_j$) and the Cut and Link functions are chosen depending on the properties of the superpixels ($S_i$, $S_j$), selecting the pair of superpixels that has the highest similarity value, determining that the selected pair of superpixels that has the highest similarity value, when merged, is more than a constant, h, times larger than the smallest superpixel in the image, and in response thereto: a) selecting the smallest superpixel in the image, i.e. the superpixel that consists of the fewest number of pixels, b) calculating the similarity value for the similarity between pairs of the selected smallest superpixel and superpixels neighbouring the selected smallest superpixel, and further in response to the determining step: a) merging the pair of superpixels that has the highest similarity value, b) determining that the current number of superpixels in the image is greater than the received value of the final number of superpixels, and in response thereto, repeating the steps of calculate, select, determine and merge until it is determined that the current number of superpixels in the image is equal to the received value of the final number of superpixels.

In a related eights embodiment, the user device (100) according to the sixth embodiment, which is further caused to receive the constant, h, wherein h is within a range of 1 to N, and N is an original number of pixels in the received image.

In a related tenth embodiment, the user device (100) according to the sixth and seventh embodiments, which is further caused to determine the Cut ($S_i$, $S_j$)=$\Sigma_{l \in S_i} \Sigma_{l' \in S_j} \mathcal{K}_1(l,l')$, $$\text{the Link}(S_i, S_j) = \frac{e^{-\frac{\|\mu_i - \mu_j\|}{\sigma_1}}}{|S_i||S_j|}, \text{ and where } \mathcal{K}_1(l, l') = e^{-\frac{c_l + c_{l'}}{\sigma_1}},$$

$\mu_i$ represents the average color intensity of $S_i$, $c_l$ represents the contour value of the pixel corresponding to $x_l$, and $\sigma_1$ and $\sigma_2$ are constants.

In a related eleventh embodiment, a computer program (138) comprising computer program code, the computer program code being adapted, if executed on a processor (136), to implement the method according to any one of the first through fifth embodiments.

In a related twelfth embodiment, a computer program product comprising a computer readable storage medium (140), the computer readable storage medium having the computer program (138) according to the ninth embodiment.

In an embodiment, the present invention relates to a method of merging superpixels in an image from an initial number of superpixels into a final number of superpixels, the method being performed by a user device (100). The method, in such an embodiment, comprises receiving the image (S100) comprising the initial number of superpixels and the value, K, (S110) of the final number of superpixels into which the image is to be segmented. An example similarity value for the similarity between each superpixel and its neighboring superpixels is calculated (S120). The similarity value is based on a Penalized Average Linkage Cuts (PALC) value between each pair of neighboring superpixels. The pair of superpixels that has the highest similarity value may be selected (S140) and the selected pair of superpixels may be merged (S180). The method may be repeated until it is determined (S190) that the current number of superpixels in the image is equal to the received value of the final number of superpixels.

While the solution has been described with reference to specific exemplary embodiments, the description is generally only intended to illustrate the inventive concept and should not be taken as limiting the scope of the solution.

What is claimed is:

1. A computer-implemented method comprising:
selecting an image comprising of a plurality of superpixels, each superpixel in the plurality of superpixels comprising a set of pixels;
calculating one or more similarity values for a smallest superpixel and corresponding one or more neighboring superpixels;
wherein the corresponding one or more neighboring superpixels have one or more pixels that are neighboring pixels with one or more pixels of the smallest superpixel;
from the corresponding one or more neighboring superpixels, determining a mergeable superpixel that has a highest similarity value from the one or more similarity values of the corresponding one or more neighboring superpixels;
merging the mergeable superpixel with the smallest superpixel thereby generating a merged superpixel;
calculating a plurality of similarity values, each similarity value of the plurality of similarity values representing a similarity of a particular superpixel and a particular neighboring superpixel;
determining, from the plurality of similarity values, a greatest similarity value representing that the particular superpixel and the particular neighboring superpixel are the most similar superpixels in the plurality of superpixels of the image;
determining, from the plurality of superpixels, the smallest superpixel that has the least number of pixels among the plurality of superpixels;
determining that, if the particular superpixel and the particular neighboring superpixel are merged generating a second merged superpixel, then the second merged superpixel has greater number of pixels than the smallest superpixel of the image by at least a threshold;
if it is determined that the second merged superpixel has greater number of pixels than the smallest superpixel of the image by at least the threshold, selecting the smallest superpixel for merging.

2. The method of claim 1, wherein the image comprises a first set of pixels of a first superpixel and a second set of pixels of a second superpixel;
wherein the first set of pixels of the first superpixel includes a first set of edge pixels neighboring a second set of edge pixels included in the second set of pixels of the second superpixel; and
the method further comprising:
determining a similarity value that represents pixel-based similarity of the first superpixel and the second superpixel, the determining comprising:
determining a link value for the first superpixel and the second superpixel, wherein the link value is based on similarity between color values of the first set of pixels and color values of the second set of pixels,
determining a cut value for the first superpixel and the second superpixel based on the first set of edge pixels of the first superpixel and the second set of edge pixels of the second superpixel, and calculating the similarity value based on the link value and the cut value for the first superpixel and the second superpixel;

based on the similarity value, determining whether to merge the first superpixel with the second superpixel;

if, based on the similarity value, it is determined to merge the first superpixel with the second superpixel, then merging the first superpixel with the second superpixel thereby generating a third superpixel that includes the first set of pixels and the second set of pixels.

3. The method of claim 2, further comprising:

calculating a distance value between the color values of the first set of pixels and the color values of the second set of pixels;

based on the distance value, determining the link value for the first superpixel and the second superpixel.

4. The method of claim 3, wherein the distance value is calculated based on one or more statistical functions applied on the color values of the first set of pixels and one or more statistical functions applied on the color values of the second set of pixels.

5. The method of claim 2, wherein the link value and the cut value are determined based on one or more of: size, perimeter and color intensity values of the first superpixel and based on one or more of: size, perimeter and color intensity values of the second superpixel.

6. The method of claim 2, further comprising determining the first set of edge pixels of the first superpixel based on first contour values of the first set of pixels;

determining the second set of edge pixels of the second superpixel based on second contour values of the second set of pixels wherein a contour value represents a probability value that a corresponding pixel is an edge pixel.

7. The method of claim 6, further comprising:

determining the first contour values of the first set of pixels and the second contour values of the second set of pixels based on applying one or more statistical models on color values of pixels in the image.

8. The method of claim 6, further comprising:

calculating a plurality of weight values based on the first contour values and the second contour values;

based on the plurality of weight values, determining the cut value for the first superpixel and the second superpixel.

9. The method of claim 2, further comprising:

selecting a single pixel in the image as the first superpixel;

merging the first superpixel with the second superpixel thereby generating the third superpixel that includes the single pixel of the first superpixel.

10. The method of claim 1, wherein the threshold is based on a particular number of a multiple by which the second merged superpixel is greater than the smallest superpixel.

11. A system comprising one or more processing units and memory, the memory storing a set of program instructions, which when executed by the one or more processing units, causes:

selecting an image comprising of a plurality of superpixels, each superpixel in the plurality of superpixels comprising a set of pixels;

calculating one or more similarity values for a smallest superpixel and corresponding one or more neighboring superpixels;

wherein the corresponding one or more neighboring superpixels have one or more pixels that are neighboring pixels with one or more pixels of the smallest superpixel;

from the corresponding one or more neighboring superpixels, determining a mergeable superpixel that has a highest similarity value from the one or more similarity values of the corresponding one or more neighboring superpixels;

merging the mergeable superpixel with the smallest superpixel thereby generating a merged superpixel;

calculating a plurality of similarity values, each similarity value of the plurality of similarity values representing a similarity of a particular superpixel and a particular neighboring superpixel;

determining, from the plurality of similarity values, a greatest similarity value representing that the particular superpixel and the particular neighboring superpixel are the most similar superpixels in the plurality of superpixels of the image;

determining, from the plurality of superpixels, the smallest superpixel that has the least number of pixels among the plurality of superpixels;

determining that, if the particular superpixel and the particular neighboring superpixel are merged generating a second merged superpixel, then the second merged superpixel has greater number of pixels than the smallest superpixel of the image by at least a threshold;

if it is determined that the second merged superpixel has greater number of pixels than the smallest superpixel of the image by at least the threshold, selecting the smallest superpixel for merging.

12. The system of claim 11, wherein the image comprising a first set of pixels of a first superpixel and a second set of pixels of a second superpixel;

wherein the first set of pixels of the first superpixel includes a first set of edge pixels neighboring a second set of edge pixels included in the second set of pixels of the second superpixel; and wherein the set of program instructions comprise one or more program instructions, which, when executed by the one or more processing units, cause:

determining a similarity value that represents pixel-based similarity of the first superpixel and the second superpixel, the determining comprising:

determining a link value for the first superpixel and the second superpixel, wherein the link value is based on similarity between color values of the first set of pixels and color values of the second set of pixels, determining a cut value for the first superpixel and the second superpixel based on the first set of edge pixels of the first superpixel and the second set of edge pixels of the second superpixel, and calculating the similarity value based on the link value and the cut value for the first superpixel and the second superpixel;

based on the similarity value, determining whether to merge the first superpixel with the second superpixel;

if, based on the similarity value, it is determined to merge the first superpixel with the second superpixel, then merging the first superpixel with the second superpixel thereby generating a third superpixel that includes the first set of pixels and the second set of pixels.

13. The system of claim 12, wherein the set of program instructions comprise one or more program instructions, which, when executed by the one or more processing units, cause:
- calculating a distance value between the color values of the first set of pixels and the color values of the second set of pixels;
- based on the distance value, determining the link value for the first superpixel and the second superpixel.

14. The system of claim 13, wherein the distance value is calculated based on one or more statistical functions applied on the color values of the first set of pixels and one or more statistical functions applied on the color values of the second set of pixels.

15. The system of claim 12, wherein the link value and the cut value are determined based on one or more of: size, perimeter and color intensity values of the first superpixel and based on one or more of: size, perimeter and color intensity values of the second superpixel.

16. The system of claim 12, wherein the set of program instructions comprise one or more program instructions, which, when executed by the one or more processing units, cause:
- determining the first set of edge pixels of the first superpixel based on first contour values of the first set of pixels;
- determining the second set of edge pixels of the second superpixel based on second contour values of the second set of pixels
- wherein a contour value represents a probability value that a corresponding pixel is an edge pixel.

17. The system of claim 12, wherein the set of program instructions comprise one or more program instructions, which, when executed by the one or more processing units, cause:
- selecting a single pixel in the image as the first superpixel;
- merging the first superpixel with the second superpixel thereby generating the third superpixel that includes the single pixel of the first superpixel.

18. The system of claim 11, wherein the threshold is based on a particular number of a multiple by which the second merged superpixel is greater than the smallest superpixel.

19. One or more non-transitory computer-readable media storing a set of instructions, wherein the set of instructions includes instructions, which when executed by one or more hardware processors, cause:
- selecting an image comprising of a plurality of superpixels, each superpixel in the plurality of superpixels comprising a set of pixels;
- calculating one or more similarity values for a smallest superpixel and corresponding one or more neighboring superpixels;
- wherein the corresponding one or more neighboring superpixels have one or more pixels that are neighboring pixels with one or more pixels of the smallest superpixel;
- from the corresponding one or more neighboring superpixels, determining a mergeable superpixel that has a highest similarity value from the one or more similarity values of the corresponding one or more neighboring superpixels;
- merging the mergeable superpixel with the smallest superpixel thereby generating a merged superpixel;
- calculating a plurality of similarity values, each similarity value of the plurality of similarity values representing a similarity of a particular superpixel and a particular neighboring superpixel;
- determining, from the plurality of similarity values, a greatest similarity value representing that the particular superpixel and the particular neighboring superpixel are the most similar superpixels in the plurality of superpixels of the image;
- determining, from the plurality of superpixels, the smallest superpixel that has the least number of pixels among the plurality of superpixels;
- determining that, if the particular superpixel and the particular neighboring superpixel are merged generating a second merged superpixel, then the second merged superpixel has greater number of pixels than the smallest superpixel of the image by at least a threshold;
- if it is determined that the second merged superpixel has greater number of pixels than the smallest superpixel of the image by at least the threshold, selecting the smallest superpixel for merging.

* * * * *